(No Model.)
S. R. DIVINE & A. C. RAND.
METHOD OF PREPARING BLASTING CARTRIDGES.
No. 289,761. Patented Dec. 4, 1883.
Fig. 1.
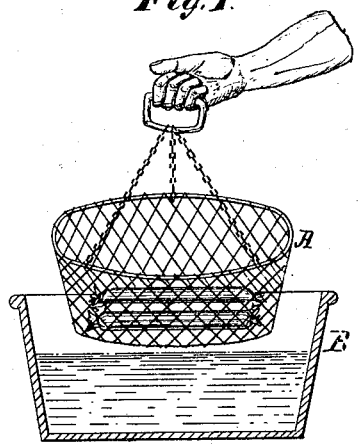
Fig. 2.
Fig. 3.
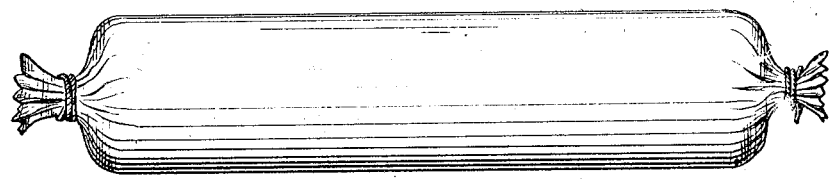
Fig. 4.     Fig. 5.     Fig. 6.
  
Fig. 7.     Fig. 8.     Fig. 9.
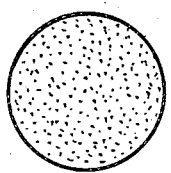 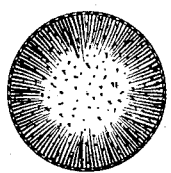 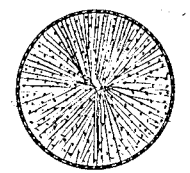
Witnesses:
Henry Eichling
A. S. Fitch
Inventors:
Silas R. Divine
Addison C. Rand
By H. Fitch
atty

UNITED STATES PATENT OFFICE.

SILAS R. DIVINE, OF LOCH SHELDRAKE, AND ADDISON C. RAND, OF NEW YORK, N. Y., ASSIGNORS TO THE REND ROCK POWDER COMPANY, OF NEW JERSEY.

METHOD OF PREPARING BLASTING-CARTRIDGES.

SPECIFICATION forming part of Letters Patent No. 289,761, dated December 4, 1883.

Application filed February 10, 1883. Renewed August 22, 1883. (No model.)

*To all whom it may concern:*

Be it known that we, SILAS R. DIVINE, of Loch Sheldrake, in the county of Sullivan and State of New York, and ADDISON C. RAND, of the city, county, and State of New York, have invented an Improved Method of Preparing Cartridges for Blasting and other Purposes, of which the following is a full, clear, and exact description, reference being had to the accompanying drawings, forming part of this specification.

The object of our invention is to facilitate the preparation for use of cartridges composed of two ingredients, one of which is a solid and the other a liquid substance, which, when combined by the absorption by and equal distribution throughout the mass of the solid of the liquid in proper proportion, constitutes a high explosive compound—as, for example the compound for which Letters Patent No. 243,432 were granted June 28, 1881, on the application of Silas R. Divine, in which the solid ingredient is chlorate of potash or its equivalent and the liquid ingredient is nitro-benzole or its equivalent.

Our invention relates more particularly to an improvement upon the art of blasting, which is described and claimed in Letters Patent No. 243,433, granted June 28, 1881, on due application; and it consists in taking the cartridge-shells, composed of porous material—such as cloth or paper, and filled with the solid ingredient of the compound—and, first, submerging them in a bath of the liquid ingredient for a certain predetermined space of time, and only until there shall have been absorbed by each cartridge a proper proportion of the liquid; second, removing the cartridges from the bath; and, finally, allowing the absorbed liquid ingredient to become equally distributed throughout the mass of the solid ingredient of the cartridges prior to exploding the cartridges in drill-holes, as in blasting or otherwise, all as hereinafter particularly described.

Figure 1 represents the apparatus which we preferably employ in practicing our invention. Figs. 2 and 3 represents, in side elevation, two cartridges, differing from each other in size. Figs. 4, 5, and 6 represent cross-sections of the smaller cartridge seen in Fig. 2, and show the envelope or casing of the cartridge and the contained solid ingredient, respectively, prior to submergence in the bath of the liquid ingredient immediately after withdrawal from said bath, and when the absorbed liquid has become equally distributed throughout the solid ingredient; and Figs. 7, 8, and 9 represent cross-sections of the larger cartridge under respectively similar conditions.

Heretofore in preparing cartridges, for use as in blasting operations, composed of a solid ingredient—such as chlorate of potash—and a liquid ingredient—such as nitro-benzole—the porous cartridge-shells containing the solid have been immersed in the liquid ingredient without discrimination as to the duration of the immersion, and have been subsequently wrung out or otherwise manipulated to expel the excess of liquid with which they have become saturated, in order to secure the proper relative proportions in each cartridge of the two ingredients; or, each cartridge has been opened at one end and the proper proportion of the liquid ingredient has been introduced by pouring it from a package or bottle containing only the definite and designated quantity of the liquid requisite for such particular size of cartridge; or the two ingredients have been initially mixed in proper proportions in a suitable vessel, and the compound thus constituted has been introduced into the cartridge-cases.

Our described invention is an improvement in convenience of handling and accuracy of results attained over the methods heretofore employed.

In carrying out our invention we take the cartridge-shells composed of porous material—such as cloth or paper—and filled with the solid ingredients, preferably in a crushed or powdered state, and submerge them in a bath of the liquid ingredient. To accomplish this, we find it preferable to provide a perforated receptacle—such as an open-work wire basket—with a suitable bail or handle, as shown at A, in which are placed the cartridges, and a vessel, as seen at B, to contain the bath of the liquid, and adapted to receive within it the basket A. Thus the basket A, being grasped by the bail, may with its contained cartridges be readily lowered or dipped into the bath and the cartridges quickly and effectively submerged in the liquid. The cartridges containing the solid ingredient should be submerged in the bath for such a definite space of time only as will secure the absorption of the proper proportion of the liquid ingredient relatively to the quantity of the solid ingredient of each cartridge, so that when said absorbed liquid becomes equally distributed throughout the mass of the solid there will be constituted in the cartridge the proportions in which the ingredients of the compound will combine most effectively as an explosive.

We find that when chlorate of potash is used as the solid and nitro-benzole as the liquid the proper proportions to this end, as stated in the before-referred-to Letters Patent—namely, from three to four, or four and one-sixth parts of the solid to one part of the liquid—will be secured in cartridges by submerging them during a certain length of time relatively to their diameters, as follows: Submerge a cartridge of about one and one-fourth inch diameter during about three seconds; a cartridge of about one and one-half inch diameter during about four seconds; a cartridge of about one and three-fourths inch diameter during about five seconds, and a cartridge of about two inches diameter during about six seconds. Cartridges of a greater or less diameter than those stated should, it is obvious, be submerged during a proportionately greater or less period of time, and reference should also be had to the fluidity of the liquid.

When the cartridges are submerged, the porous envelope thereof and that portion of the mass of the contained solid lying next to the said envelope will absorb the liquid, and during the time designated for the submergence relatively to the diameter of the cartridge, as set forth, the envelope and that portion of the solid immediately contiguous thereto will absorb the proper or desired proportion of the liquid. In cartridges of different diameters this absorption will, owing to the relatively-varying periods of time, as specified, extend more or less into the portion of the mass of the cartridge contiguous to the envelope. Thus in a larger cartridge submerged for a longer time the absorption will extend somewhat farther inward than in a smaller cartridge submerged for a lesser time. This is fully illustrated in the drawings, where, in Figs. 4 and 7, are shown in cross-section cartridges of different diameters containing the solid ingredient prior to the submergence, and in Figs. 5 and 8 are shown these cartridges, respectively, immediately after their submergence and withdrawal from the bath. The absorption in the instance of the lesser cartridge, it is seen, will have extended less into the mass of the solid than in the instance of the larger cartridge; but in each instance under our method the cartridge will have absorbed during the submergence into its envelope and the portion of the mass of the solid immediately contiguous thereto the proper proportion of the liquid which, when equally distributed throughout the mass of the solid, will constitute in the cartridge the proportions in which the ingredients of the compound will combine most effectively.

In the further carrying out of our invention, when the cartridges have been submerged as described, we remove them from the bath and then allow the absorbed liquid to distribute itself equally throughout the mass of the solid, as illustrated in Figs. 6 and 9, prior to exploding the cartridges either after seating them in drill-holes, as in blasting, or otherwise. This will be conveniently accomplished by removing the cartridges from the basket and placing them on a suitable shelf or tray and permitting them to remain thus during the space of a few minutes, having regard to their size and also to the fineness with which the solid is crushed or powdered, and thereafter they are ready for use.

What we claim as our invention, and desire to secure by Letters Patent, is—

The described process of preparing an explosive compound composed of two ingredients—one a solid and the other a liquid—which consists in taking the cartridge-shells composed of porous material—such as cloth or paper—and filled with the solid ingredient, and first submerging them in a bath of the liquid ingredient for a predetermined space of time and only until there shall have been absorbed a proper proportion of the liquid; second, removing the cartridges from the bath; and, finally, allowing the absorbed liquid to become equally distributed throughout the mass of the solid of the cartridges prior to exploding them in drill-holes, as in blasting or otherwise, all as specified.

SILAS R. DIVINE.
ADDISON C. RAND.

In presence of
T. P. FITCH,
W. H. JEWELL.